United States Patent
Do et al.

(10) Patent No.: US 6,537,638 B2
(45) Date of Patent: Mar. 25, 2003

(54) MAGNETIC RECORDING DISK WITH PERPENDICULAR MAGNETIC RECORDING LAYER AND MULTILAYERED UNDERLAYER STRUCTURE

(75) Inventors: Hoa Do, Fremont, CA (US); Yoshihiro Ikeda, San Jose, CA (US); Yoshiaki Sonobe, San Jose, CA (US); Kentaro Takano, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/681,056

(22) Filed: Dec. 13, 2000

(65) Prior Publication Data

US 2002/0071967 A1 Jun. 13, 2002

(51) Int. Cl.⁷ .............................. G11B 5/66; G11B 5/70; B32B 3/02
(52) U.S. Cl. ............... 428/65.3; 428/65.6; 428/694 TS; 428/694 TM; 428/900
(58) Field of Search .................... 428/694 TS, 694 TM, 428/900, 65.3, 65.6

(56) References Cited

U.S. PATENT DOCUMENTS

| | | | | |
|---|---|---|---|---|
| 4,677,032 A | * | 6/1987 | Robinson | 428/611 |
| 5,693,426 A | | 12/1997 | Lee et al. | 428/611 |
| 5,750,270 A | * | 5/1998 | Tang et al. | 428/611 |
| 6,110,582 A | * | 8/2000 | Wu et al. | 428/332 |
| 6,159,625 A | * | 12/2000 | Ueno | 428/694 T |
| 6,248,416 B1 | * | 6/2001 | Lambeth et al. | 428/65.3 |
| 6,261,681 B1 | * | 7/2001 | Suekane et al. | 428/332 |
| 6,268,036 B1 | * | 7/2001 | Marinero et al. | 428/65.3 |

OTHER PUBLICATIONS

I. S. Lee et al., *Role of a Paramagnetic Amorphous CoZr Seed Layer in CoCrPt/Ti Perpendicular Recording Media*, Journal of Applied Physics, vol. 85, No. 8, Apr. 15, 1999, pp. 6133–6135.

Y. Hirayama et al., *Development of High Resolution and Low Noise Single–Layered Perpendicular Recording Media for High Density Recording*, IEEE Transactions on Magnetics, vol. 33, No. 1, Jan. 1997, pp. 996–1001.

* cited by examiner

Primary Examiner—Holly C. Rickman
(74) Attorney, Agent, or Firm—Thomas R. Berthold

(57) ABSTRACT

A perpendicular magnetic recording disk has an underlayer structure that causes the magnetic layer to have perpendicular magnetic anisotropy and high signal-to-noise ratio (SNR). The underlayer structure comprises a B2 type body-centered-cubic (BCC) material, such as the binary alloys NiAl, RuAl and RuTi, as an underlayer, and a Ti or TiCr alloy sublayer formed directly on the underlayer. The magnetic layer, such as a CoCrPt alloy, is deposited directly on the sublayer. The magnetic layer has perpendicular magnetic anisotropy due to the sublayer yet excellent SNR because of the smaller grain size of the sublayer material formed directly on the B2 type underlayer.

9 Claims, 2 Drawing Sheets

MAGNETIC RECORDING DISK WITH PERPENDICULAR MAGNETIC RECORDING LAYER AND MULTILAYERED UNDERLAYER STRUCTURE

CROSS REFERENCE TO RELATED APPLICATIONS

In pending application Ser. No. 09/487,234 filed Jan. 19, 2000, now U.S. Pat. No. 6,468,670, the same inventors as in this present invention claim a perpendicular magnetic recording disk with a composite magnetic layer formed of two distinct magnetic layers exchange coupled across their interface. In one embodiment in that pending application the inventors describe a NiAl/Ti bilayer structure, similar to that of the present invention, that is used as an underlayer structure for the composite magnetic layer.

BACKGROUND OF THE INVENTION

This invention relates to magetic recording disks for use in perpendicular magneic recording systems, such as rigid disk drives.

Perpendicular magnetic recording, wherein the recorded bits are stored in a perpendicular orientation in the media, is considered to be a promising path toward ultra-high recording densities in magnetic recording rigid disk drives. While perpendicular magnetic recording rigid disk drives have not yet been commercially realized, several types of perpendicular magnetic recording media have been proposed.

The most widely reported type of perpendicular media is a cobalt alloy (e.g., CoCr or CoCr with one or more of Pt, Nb and Ta) "granular" layer grown on a growth-enhancing sublayer that induces the crystalline C-axis to be perpendicular to the plane of the layer, so that the layer has strong perpendicular magnetic anisotropy. This type of media is called "granular" because the individual grains are only weakly exchange coupled laterally.

To achieve granular Co alloy perpendicular recording media with good signal-to-noise ratio (SNR) at high recording density, it is believed that very good crystalline orientation of the Co alloy is necessary. The perpendicular orientation of the Co alloy C-axis with respect to the film plane has usually been obtained by grain-to-grain epitaxial growth of the hexagonal (HCP) Co alloy thin film to an oriented HCP sublayer of (0002) crystalline texture or a face-centered-cubic (FCC) crystalline underlayer of (111) crystalline texture. Titanium (Ti) and $Ti_{90}Cr_{10}$ are often cited as the best sublayers for this purpose, although other materials, such as Pt, CoO/Pt and nonmagnetic $CoCr_{35}$ have been used. See Y. Hirayama et al., "Development of High Resolution and Low Noise Single Perpendicular Recording Media for High Density Recording", IEEE Trans. Magn., Vol. 33, No. 1, p. 996 (January 1997). An underlayer structure of Ti/CoZr has also been suggested, wherein the CoZr layer is said to reduce the surface roughness of the bare glass substrate on which it is formed. See I. S. Lee et al., "Role of a paramagnetic amorphous CoZr seed layer in CoCrPt/Ti perpendicular recording media", J. Appl. Phys., Vol. 85, No 8, Apr. 15, 1999, pp. 6133–6135.

Materials with a B2 body-centered-cubic (BCC) crystalline structure, such as $Ni_{50}Al_{50}$, have been described as good sublayers for supporting the known Cr underlayers onto which horizontal or longitudinal Co alloy media is formed, as described in U.S. Pat. No. 5,693,426. These B2 type sublayers serve as good templates for the <110> Cr orientation which causes the C-axis of the Co alloy media to be in-plane. Thus, the combination of $Ni_{50}Al_{50}$ with Cr and Cr-based alloy underlayers results in the formation of longitudinal media.

To obtain high SNR of the Co alloy perpendicular media, the grain size of the media needs to be made small enough to obtain the high resolution required for sharp magnetic bit transitions. Thus what is needed is a perpendicular magnetic recording media with an underlayer structure that produces Co alloy media with small grain size but yet does not significantly reduce the desired crystalline structure.

SUMMARY OF INVENTION

The present invention is a perpendicular magnetic recording disk with an underlayer structure that causes the magnetic layer to have perpendicular magnetic anisotropy and high SNR. The underlayer structure comprises a B2 type BCC material, such as the binary alloys NiAl, RuAl and RuTi, as an underlayer, and a Ti or TiCr alloy sublayer formed directly on the underlayer. The magnetic layer, such as a CoCrPt alloy, is deposited directly on the sublayer. The magnetic layer has perpendicular magnetic anisotropy due to the sublayer yet excellent SNR because of the smaller grain size of the sublayer material formed directly on the B2 type underlayer.

For a fuller understanding of the nature and advantages of the present invention, reference should be made to the following detailed description taken together with the accompanying figures.

DETAILED DESCRIPTION

Figure 1:
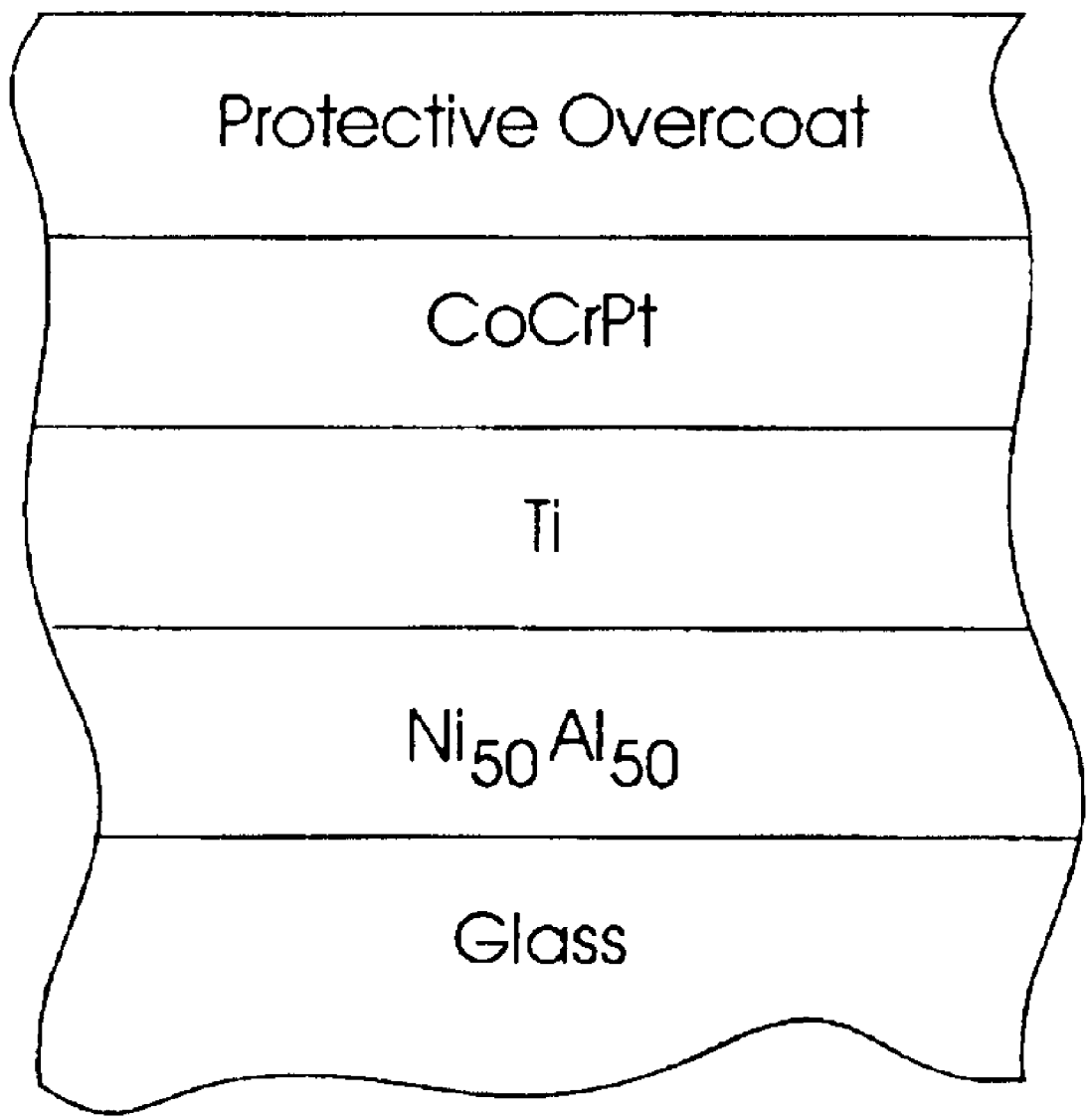
FIG. 1 is a schematic sectional view of the perpendicular magnetic recording disk according to the present invention.

In the ideal perpendicular recording medium, the easy direction of magnetization should be aligned perpendicular to the film plane. Titanium (Ti) is a well-known template layer or sublayer for CoCr alloy based perpendicular media. With the use of a Ti underlayer, the C-axis of the CoCr HCP crystalline structure is oriented out of the film plane. However, the Ti layer promotes the formation of large grains, which decreases the SNR. In the present invention, the average grain size of the CoCr alloy magnetic layer has been reduced through the use of an additional layer under the Ti sublayer FIG. 1 shows a schematic sectional view of the preferred medium. In this structure, a $Ni_{50}Al_{50}$ (50 atomic percent Ni and Al) layer was formed on the disk substrate beneath the Ti sublayer. The hard disk substrate used was a commercially available glass substrate, but may also be a conventional aluminum alloy with a NiP surface coating, or an alternative substrate, such as silicon, canasite or silicon-carbide. The NiAl layer was found to not only protect the Ti sublayer from impurity contamination by the substrate, but also resulted in smaller grain size in the Ti layer.

Figure 2:
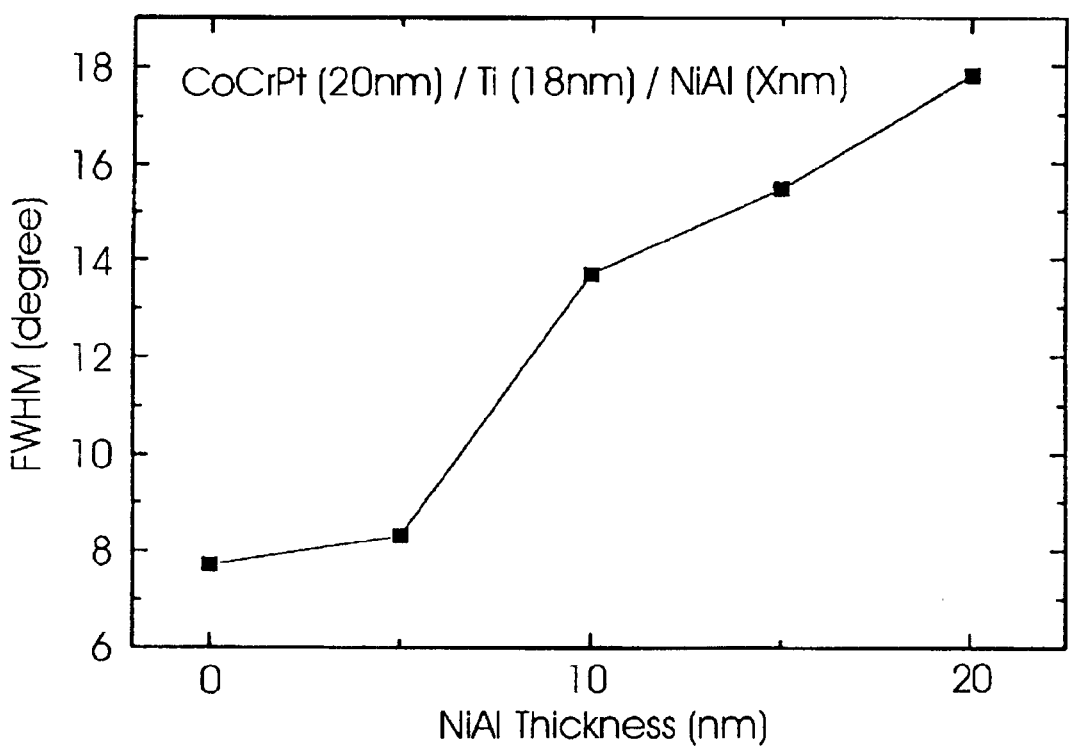
FIG. 2 is a graph of full width half maximum (FWHM) X-ray diffraction rocking curves for a CoCrPt film with a Ti sublayer and a NiAl underlayer, as a function of NiAl thickness.

FIG. 2 shows the data for the full width half maximum (FWHM) of the X-ray diffraction rocking curve of an HCP $Co_{70}Cr_{20}Pt_{10}$ film formed on a 18 nm Ti sublayer on a NiAl underlayer, as a function of NiAl thickness. The FWHM data shows that as the NiAl thickness increases there is a reduction in the crystalline texture of the CoCrPt film, which means there is a reduction in the perpendicular C-axis orientation which is desired for perpendicular media. The data of FIG. 2 alone thus suggests that the thick NiAl underlayer may obstruct the grain growth of the HCP CoCrPt, and is undesirable for use in perpendicular media structures.

Figure 3:
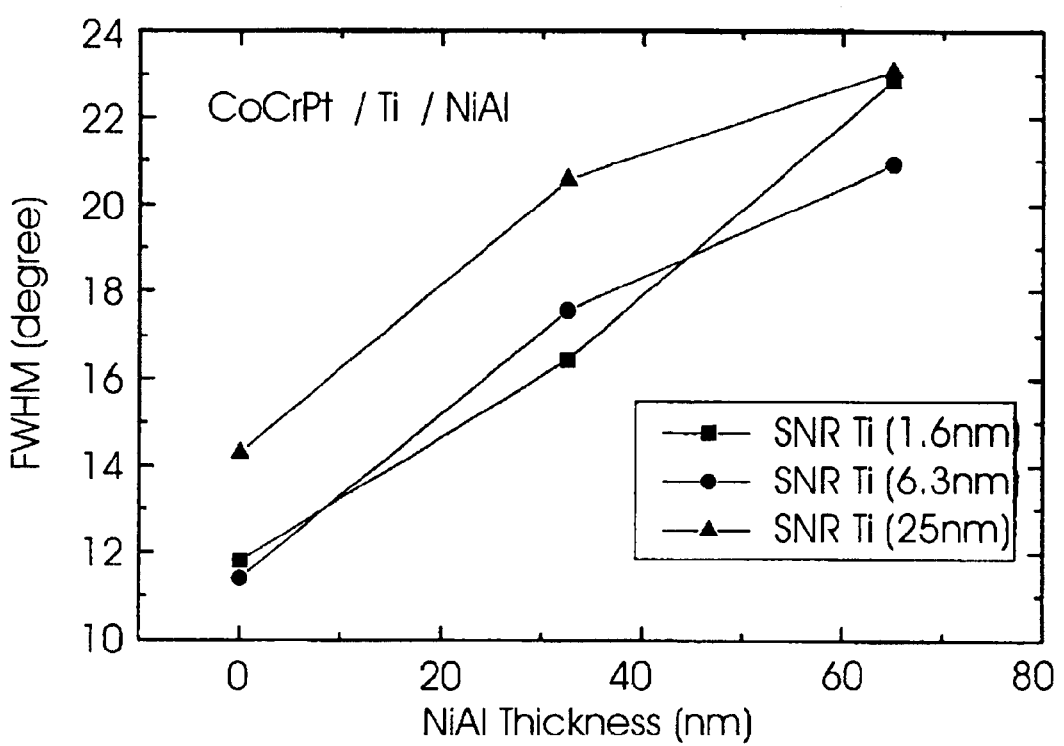
FIG. 3 is a graph of SNR for CoCrPt media structures with three different Ti sublayer thicknesses and a NiAl underlayer, as a function of NiAl thickness.

However, the present invention is based on the possibility that the data of FIG. 2 may also suggest that the NiAl underlayer inhibits the lateral grain size growth of the CoCrPt grains, so that the CoPtCr film may in fact have a very fine grain structure. Thus the SNR for the perpendicular media structure of FIG. 1 was measured as a function of NiAl thickness. FIG. 3 shows the SNR dependence on the NiAl thickness for media structures with three different Ti sublayer thicknesses. The SNR was measured at 280 kBPI linear recording density. The media without the NiAl underlayer shows low SNR even with a thick (25 nm) Ti sublayer. The introduction of the NiAl underlayer clearly enhances the SNR and the enhancement increases with increasing NiAl thickness. The SNR enhancement is 8 to 10 dB higher for the media with a 62 nm NiAl underlayer than the media without NiAl. The trend is consistent and independent of the thickness of the intermediate Ti layer. This significant effect indicates that the Ti/NiAl underlayer structure may cause the crystals of the CoCr-based film to be of a very fine structure, but still have an out-of-plane C-axis orientation.

The enhanced SNR performance is believed to result from the balance of properties between NiAl and Ti. NiAl sets the fine grain structure and poor perpendicular Corientation, whereas the Ti sublayer favors the orientation of the C-axis out-of-plane and promotes larger grain sizes. NiAl alone would promote longitudinally oriented media with too-small grains, which is known to lead to small coercivity values and lower thermal stability. Ti alone would promote too-large grains (with large coercivity) and high C-axis out-of-plane orientation, which is known to lead to poor SNR.

The known NiAl effects of inducing in-plane C-axis orientation for longitudinal recording are overcome by using a Ti sublayer beneath the Co alloy media layer. Thus, the benefit of using of NiAl as an underlayer for improved SNR performance in perpendicular Co alloy media does not extend to all sublayers used for perpendicular media. When the NiAl underlayer was tested with CoCrPtB media formed on Cr and CoCr sublayers, the NiAl produced only longitudinal media.

In the present invention the preferred embodiment of the sublayer consists essentially of Ti, and thus includes Ti and binary alloys of TiCr with Cr present in an amount less than or equal to 10 atomic percent, such as the well-known binary alloy $Ti_{90}Cr_{10}$. However, the invention is also applicable to structures where the sublayer is the binary TiCr alloy with greater amounts of Cr, e.g., between about 10 and 55 atomic percent.

NiAl is a B2 type material that retains its B2 BCC crystalline structure over a range of Al between about 42 and 55 atomic percent. In addition to NiAl, the present invention includes other B2 type materials as the underlayer, such as the binary alloys RuAl and RuTi wherein the constituent elements are present in approximately a 50:50 atomic percent ratio. These underlayers, when combined with the Ti or TiCr sublayers, showed similar SNR improvement as demonstrated by Ti/NiAl. The Co alloy perpendicular granular type media applicable with the present invention may be any of the known material compositions, such as CoCr or CoCr with one or more of Pt, Nb and Ta, and with or without the addition of boron (B).

In perpendicular magnetic recording systems that use pole heads for reading and writing, a "soft" magnetically permeable underlayer is often used on the substrate beneath the growth-enhancing underlayer structure to provide a flux return path for the field from the read/write pole head. In perpendicular magnetic recording systems that use ring heads for reading and writing, a soft flux return layer may not be necessary. In the present invention the alloy materials that are suitable for the soft flux return layer and that would be located between the substrate and the NiAl underlayer include NiFe, FeAlSi, FeTaN, FeN, CoFeB, CoTaZr, FeTaC and CoZrNb.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording disk comprising:
   a substrate;
   an underlayer on the substrate, the underlayer being a material selected from the group consisting of the binary alloys NiAl, RuAl and RuTi, the constituent elements in each of the binary alloys being present in approximately a 50:50 atomic percent ratio;
   a sublayer directly on the underlayer, the sublayer being a material selected from the group consisting of Ti and an alloy consisting of Ti and Cr, wherein the Ti is present in the TiCr alloy in an amount greater than or equal to 90 atomic percent and less than 100 atomic percent; and
   a Co alloy magnetic layer having perpendicular magnetic anisotropy directly on the sublayer.

2. The disk according to claim 1 wherein the underlayer is NiAl having Al present in the range of 42 to 55 atomic percent.

3. The disk according to claim 1 wherein the magnetic layer is a CoCrX alloy, wherein X is one or more of Pt, Ta and Nb.

4. The disk according to claim 1 wherein the magnetic layer includes B.

5. The disk according to claim 1 further comprising a magnetically permeable flux return layer selected from the group consisting of NiFe, FeAlSi, FeTaN, FeN, CoFeB, CoTaZr, FeTaC and CoZrNb, the magnetically permeable flux return layer being located between the substrate and the underlayer.

6. A perpendicular magnetic recording disk comprising:
   a substrate;
   an underlayer on the substrate, the underlayer consisting of the binary alloy NiAl wherein Al is present in the compositional range of 42 to 55 atomic percent;
   a sublayer consisting of Ti directly on the NiAl underlayer; and
   a CoCr alloy magnetic layer having perpendicular magnetic anisotropy directly on the Ti sublayer.

7. The disk according to claim 6 wherein the magnetic layer is a CoCrX alloy, wherein X is one or more of Pt, Ta and Nb.

8. The disk according to claim 6 wherein the magnetic layer includes B.

9. The disk according to claim 6 further comprising a magnetically permeable flux return layer selected from the group consisting of NiFe, FeAlSi, FeTaN, FeN, CoFeB, CoTaZr, FeTaC and CoZrNb, the magnetically permeable flux return layer being located between the substrate and the NiAl underlayer.

* * * * *